(12) United States Patent
Chen et al.

(10) Patent No.: US 12,178,196 B2
(45) Date of Patent: Dec. 31, 2024

(54) RECIRCULATION AQUACULTURE SYSTEM AND METHOD

(71) Applicant: Qinghai Photon Ecology Co., Ltd., Haidong (CN)

(72) Inventors: Jiarui Chen, Haidong (CN); Lizhi Li, Haidong (CN); Weijun Bai, Haidong (CN)

(73) Assignee: Qinghai Photon Ecology Co., Ltd., Haidong (CN)

( * ) Notice: Subject to any disclaimer, the term of this patent is extended or adjusted under 35 U.S.C. 154(b) by 173 days.

(21) Appl. No.: 18/122,943

(22) Filed: Mar. 17, 2023

(65) Prior Publication Data

US 2024/0224957 A1    Jul. 11, 2024

(30) Foreign Application Priority Data

Jan. 10, 2023  (CN) .......................... 202310034761.8

(51) Int. Cl.
*A01K 63/04* (2006.01)
*A01K 61/10* (2017.01)
(Continued)

(52) U.S. Cl.
CPC ............ *A01K 63/045* (2013.01); *A01K 61/10* (2017.01); *A01K 61/80* (2017.01); *A01K 63/047* (2013.01); *A01K 63/10* (2017.01); *B01D 29/56* (2013.01); *B01D 29/60* (2013.01); *B01D 29/68* (2013.01); *C02F 1/004* (2013.01); *B01D 2201/16* (2013.01); *B01D 2201/188* (2013.01); *B01D 2201/204* (2013.01); *C02F 2103/20* (2013.01);
(Continued)

(58) Field of Classification Search
CPC .... A01K 63/045; A01K 63/047; A01K 63/10; A01K 61/10; A01K 61/80
See application file for complete search history.

(56) References Cited

U.S. PATENT DOCUMENTS 5,288,400 A * 2/1994 Phillips ................ A01K 63/045
                                                                                210/220
5,466,373 A * 11/1995 Handwerker ............. C02F 3/06
                                                                                210/150

(Continued)

*Primary Examiner* — Christopher D Hutchens
(74) *Attorney, Agent, or Firm* — Notaro, Michalos & Zaccaria P.C.

(57) ABSTRACT

The present disclosure provides a recirculation aquaculture system and method. The system includes a fish pond and a fiber turntable filtering system. The fiber turntable filtering system can implement can remove large particles in aquaculture water and regularly harvest microalgae, water quality after treatment reaches a fishery aquaculture standard, and 97% of the aquaculture water can be directly recycled. In the present disclosure, during in-situ culture of microalgae and fish, microalgae can convert $CO_2$ exhaled by fish and nutrients such as nitrogen and phosphorus in the aquaculture water into substances of algae cells, such as proteins, polysaccharides, vitamins, and lipids, and release oxygen, so as to quickly improve quality of the aquaculture water; in-situ culture of the microalgae and the fish gives play to the advantages of high photosynthetic efficiency of the microalgae, and the fast-growing microalgae provide a suitable growth environment for the fish.

20 Claims, 2 Drawing Sheets

(51) Int. Cl.
*A01K 61/80* (2017.01)
*A01K 63/10* (2017.01)
*B01D 29/56* (2006.01)
*B01D 29/60* (2006.01)
*B01D 29/68* (2006.01)
*C02F 1/00* (2023.01)
*C02F 103/20* (2006.01)

(52) U.S. Cl.
CPC .. *C02F 2201/005* (2013.01); *C02F 2301/046* (2013.01); *C02F 2301/063* (2013.01); *C02F 2303/16* (2013.01)

(56) References Cited

U.S. PATENT DOCUMENTS

| | | | | |
|---|---|---|---|---|
| 5,799,612 A | * | 9/1998 | Page | A01K 63/045 119/260 |
| 5,868,926 A | * | 2/1999 | Hickok | C02F 3/082 210/150 |
| 9,388,372 B2 | * | 7/2016 | Wilson | A01K 63/06 |
| 2015/0373954 A1 | * | 12/2015 | Kuo | C02F 1/24 210/151 |

* cited by examiner

ND METHOD

RECIRCULATION AQUACULTURE SYSTEM AND METHOD

CROSS REFERENCE TO RELATED APPLICATION

This patent application claims the benefit and priority of Chinese Patent Application No. 202310034761.8, filed with the China National Intellectual Property Administration on Jan. 10, 2023, the disclosure of which is incorporated by reference herein in its entirety as part of the present application.

TECHNICAL FIELD

The present disclosure relates to the technical field of aquaculture, and in particular, to a recirculation aquaculture system and method.

BACKGROUND

Aquaculture is an important part of China's food security guarantee system, and provides a large number of high-quality animal-derived proteins for the people. Recirculating aquaculture has become an inevitable trend of current aquaculture development because of its advantages that the recirculating aquaculture saves water and has a high aquaculture density, and a system is controllable and is not susceptible to an external environment, etc. A current recirculating aquaculture system usually includes treatment units such as a sedimentation unit, a filtration unit, a biofilter, an aeration unit, a temperature regulation unit, and a sterilization unit. The biofilter as a core unit only transforms harmful nitrogen-containing pollutants into nitrate nitrogen with low toxicity by nitration, and cannot completely remove the harmful nitrogen-containing pollutants from aquaculture water. To further improve a self-purification ability, in recent years, large algae, aquatic plants and cultured varieties are cultured in situ, and their photosynthesis is used to remove pollutants such as N and P in the aquaculture water, thereby effectively improving water quality, and reducing $CO_2$ emissions to a certain extent. Nevertheless, there are new problems. For example, large algae and aquatic plants need a high light intensity when efficiently transforming N and P, while fish prefer a relatively dark environment; and for another example, large algae and aquatic plants need to be harvested regularly, which makes it difficult to ensure stability of the N and P removal capacity of the recirculating aquaculture system.

Microalgae are a type of unicellular algae that has a small volume and a simple structure and grows rapidly, and have the advantages such as high photosynthetic efficiency, strong environmental adaptability, short doubling time, and ease of integration by using other engineering technologies. The microalgae can transform, through photosynthesis, inorganic nitrogen and phosphorus nutrients such as $NH_4^+$—N, $NH_3$—N, $NO_2^-$—N, $NO_3^-$—N, and $PO_4^{3-}$—P into substances of algae cells, such as proteins, polysaccharides, fats, vitamins, and nucleic acids. A combination of microalgae culture and aquaculture wastewater treatment can implement purification of aquaculture wastewater, recovery of N and P nutrients, and production of edible microalgae for fish. For this reason, a recirculation aquaculture system for in-situ culture of microalgae and fish is promising.

It is well known that, the composition of particles in recirculating water is complex, and includes fish manure, residual bait, etc., with a large size change range, from centimeter to nanometer. Many particles will become smaller or even dissolved if they are not removed in time. A current treatment method is to first remove large particles by using sedimentation and a filter screen, and then to separate and remove small particles by using foam. The introduction of microalgae makes the composition of particles in a recirculation aquaculture system more complicated, the large particles are also removed first, and microalgae are removed from the system only when harvested. Therefore, how to efficiently remove large particles and regularly harvest microalgae is a key to determining whether the recirculation aquaculture system is successful.

SUMMARY

In view of this, an objective of the present disclosure is to provide a recirculation aquaculture system and method. The recirculation aquaculture system according to the present disclosure is a fish aquaculture system for in-situ culture of fish and microalgae, and can implement recirculating fish aquaculture at a high density, high stability and low energy consumption.

To achieve the above objective, the present disclosure provides the following technical solutions:

The present disclosure provides a recirculation aquaculture system, including a fish pond and a fiber turntable filtering system, where the fish pond includes a fish pond body, a water inlet, and a water outlet;
the fiber turntable filtering system includes a first fiber turntable filtering system and a second fiber turntable filtering system;
the first fiber turntable filtering system is located in a first filter tank; the second fiber turntable filtering system is located in a second filter tank;
the first fiber turntable filtering system includes a first fiber turntable filter;
the second fiber turntable filtering system includes a second fiber turntable filter;
a filter cloth in the first fiber turntable filter has a pore diameter of 15-30 μm;
a filter cloth in the second fiber turntable filter has a pore diameter of 1-5 μm;
the first fiber turntable filtering system and the second fiber turntable filtering system each include a backwashing system and a supporting electrical control system;
the water outlet of the fish pond communicates with the first filter tank and the second filter tank through a pipeline; and
a filtered water outlet of the fiber turntable filtering system communicates with the water inlet of the fish pond through a pipeline.

Preferably, the first fiber turntable filtering system and the second fiber turntable filtering system have a same filtration flux to same aquaculture sewage.

Preferably, a filtered water collecting tank is arranged between the first filter tank and the second filter tank; a bottom of the filtered water collecting tank is provided with a filtered water outlet; the first filter tank and the second filter tank are each provided with a sewage discharge outlet; and the first fiber turntable filtering system and the second fiber turntable filtering system share the filtered water collecting tank and the filtered water outlet.

Preferably, the fiber turntable filtering system further includes a sludge discharge system; the sludge discharge system includes sludge discharge pipes respectively arranged at bottoms of the first filter tank and the second filter tank, and the sludge discharge pipes communicate with a reverse suction pump through a pipeline.

Preferably, the sludge discharge pipes in the first filter tank and the second filter tank are each provided with an electric valve; and the first fiber turntable filtering system and the second fiber turntable filtering system share the reverse suction pump.

The present disclosure further provides a recirculation aquaculture method based on the recirculation aquaculture system in the above solution, including the following steps:
1) injecting water and adding pre-cultured high-activity microalgae into the fish pond body until an algae density of aquaculture water is 50-1000 mg/L;
2) putting fry, and feeding feed into the fish pond every 3-5 hours; and
3) during culture, when the microalgae are in a final stage of stable growth and are about to enter a decline stage, turning off the first fiber turntable filter, and turning on the second fiber turntable filter, so that the microalgae no longer return to the fish pond; discharging the intercepted microalgae through the backwashing system, replenishing a certain volume of pre-cultured high-activity microalgae to make an algae density in the aquaculture water be 50-1000 mg/L, and harvesting fish after 150-200 days.

Preferably, an aquaculture density in step 1) is 25-35 kg/m$^3$.

Preferably, when the aquaculture density in the water is greater than or equal to 30 kg/m$^3$ and less than 60 kg/m$^3$, a water inflow and a water outflow are each set to 35-45 m$^3$/h; when the aquaculture density in the water is greater than or equal to 60 kg/m$^3$ and less than 100 kg/m$^3$, the water inflow and the water outflow are each set to 55-65 m$^3$/h and when the aquaculture density in the water is greater than or equal to 100 kg/m$^3$ and less than 200 kg/m$^3$, the water inflow and the water outflow are each set to 70-90 m$^3$/h.

Preferably, during aquaculture, dissolved oxygen in the aquaculture water is 5-12 mg/L.

Preferably, the microalgae can pass through the filter cloth in the first fiber turntable filter, but cannot pass through the filter cloth in the second fiber turntable filter; and the microalgae include one or more of *Chlorella vulgaris, Nannochloropsis Oceanica, Dunaliella salina,* and *Chlamydomonas reinhardtii.*

The present disclosure has the following beneficial effects: The present disclosure provides a recirculation aquaculture system, which includes a fish pond and a fiber turntable filtering system, where the fiber turntable filtering system includes a first fiber turntable filtering system and a second fiber turntable filtering system; the first fiber turntable filtering system is located in a first filter tank; the second fiber turntable filtering system is located in a second filter tank; the first fiber turntable filtering system includes a first fiber turntable filter; the second fiber turntable filtering system includes a second fiber turntable filter; a filter cloth in the first fiber turntable filter has a pore diameter of 15-30 μm; and a filter cloth in the second fiber turntable filter has a pore diameter of 1-5 lim.

During normal microalgae culture, the first fiber turntable filter with a pore diameter of 15-30 μm is turned on, and microalgae can return to the fish pond through the first fiber turntable filter for continued cultivation; and large particles such as fish manure and residual bait either directly sink to the bottoms of the filter tanks, or are intercepted by the filter cloth of the first fiber turntable filter, and are finally discharged through a sludge discharge system or a backwashing system for further deep purification. When the microalgae in aquaculture water need to be harvested, the second fiber turntable filter with a pore diameter of 1-5 Lim is turned on for interception, so that the microalgae cannot return to the fish pond. In the present disclosure, the fiber turntable filtering system not only can be used for filtering, but also has a precipitation function. The direct sedimentation of the large particles in aquaculture wastewater effectively prevents deterioration of water quality caused by crushing, and significantly reduces an amount of sludge on the filter cloth and an amount of backwashing water.

In a recirculation aquaculture method according to the present disclosure, aquaculture wastewater selectively passes through a first fiber turntable filter or a second fiber turntable filter. A pore diameter of a filter cloth of the first fiber turntable filter allows microalgae to pass through, but does not allow large particles to pass through, and a pore diameter of a filter cloth of the second fiber turntable filter does not allow the microalgae to pass through, so that the large particles, such as fish manure and residual bait, with a particle size greater than the pore diameter of the filter cloth of the first fiber turntable filter are quickly removed from a fish pond, while the microalgae can return to the fish pond for in-situ culture with the fish. Through photosynthesis, the microalgae can convert $CO_2$ exhaled by the fish and water-soluble nutrients such as nitrogen and phosphorus into substances of algae cells, such as proteins, polysaccharides, lipids, and vitamins, and release oxygen, to rapidly improve aquaculture water quality, and significantly reduce a demand for artificial aeration. In the present disclosure, aquaculture wastewater is regarded as a valuable resource. In-situ culture of the fish and the microalgae in the fish pond can not only purify the aquaculture wastewater and recycle nutrients, but also produce microalgae biomass that can be directly eaten by fish or conducive to fish growth. In the present disclosure, in-situ culture of the microalgae and the fish gives full play to the advantages of high photosynthetic efficiency of the microalgae, and the fast-growing microalgae provide a suitable growth environment for the fish.

In the present disclosure, the fiber turntable filtering system quickly removes the microalgae in a final stage of stable growth from the fish pond, thereby preventing deterioration of water quality caused by the problem with the microalgae. The fiber turntable filtering system has filter precision that can reach 1 μm, and can intercept 99% or more of particles in the aquaculture wastewater, and a total solid content of filtered water is less than 2 mg/L.

In the present disclosure, the absolutely dominant microalgae can inhibit rapid proliferation of harmful bacteria in the aquaculture water, significantly reduce the use of fish medicines during aquaculture, and implement true green aquaculture. In addition, active functional groups on surfaces of the microalgae can further promote agglomeration of tiny particles, thereby omitting a device for removing the tiny particles. In the present disclosure, a reuse rate of the aquaculture wastewater can reach 97%, and recirculating fish aquaculture with low energy consumption and high stability can be implemented.

DETAILED DESCRIPTION OF THE EMBODIMENTS

Figure 1:
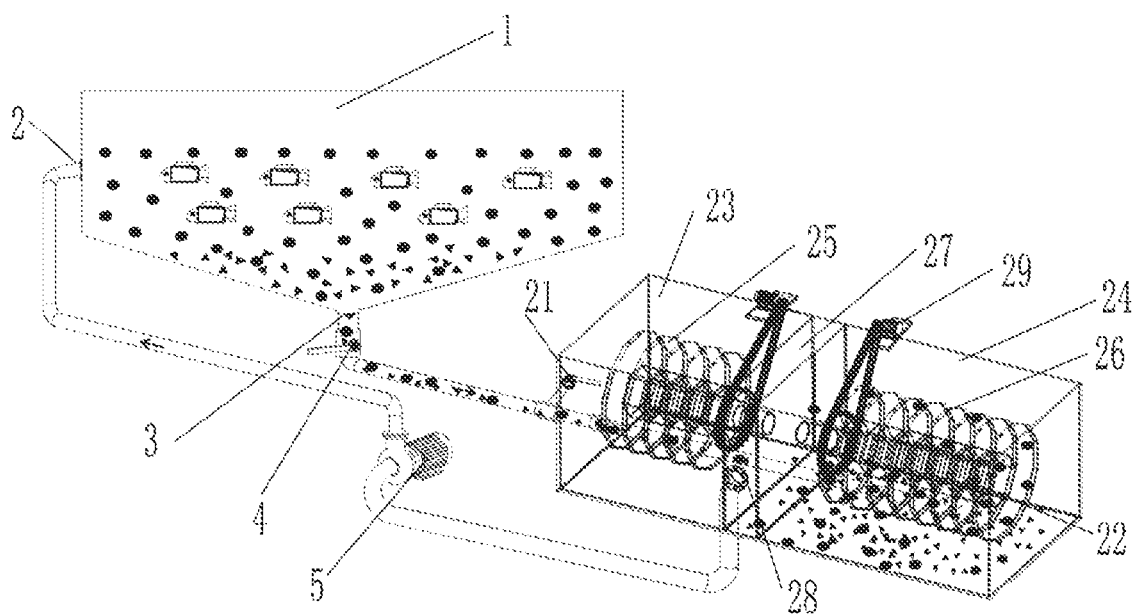
FIG. 1 is a top view of a fish pond, in which a fish pond body 1, a water inlet 2, a water outlet 3, a water outlet valve 4, a water pump 5, a water inlet 21 of a first filter tank, a water inlet 22 of a second filter tank, the first filter tank 23, the second filter tank 24, a first fiber turntable filtering system 25, a second fiber turntable filtering system 26, a filtered water collecting tank 27, a filtered water outlet 28 and a supporting electrical control system 29 are provided.

The present disclosure provides a recirculation aquaculture system, which includes a fish pond and a fiber turntable filtering system, where the fish pond includes a fish pond body, a water inlet, and a water outlet; the fiber turntable filtering system includes a first fiber turntable filtering system and a second fiber turntable filtering system; the first fiber turntable filtering system is located in a first filter tank; the second fiber turntable filtering system is located in a second filter tank; the first fiber turntable filtering system includes a first fiber turntable filter; the second fiber turntable filtering system includes a second fiber turntable filter; a filter cloth in the first fiber turntable filter has a pore diameter of 15-30 μm; and a filter cloth in the second fiber turntable filter has a pore diameter of 1-5 μm; the first fiber turntable filtering system and the second fiber turntable filtering system each include a backwashing system and a supporting electrical control system; the water outlet of the fish pond communicates with the first filter tank and the second filter tank through a pipeline; and a filtered water outlet of the fiber turntable filtering system communicates with the water inlet of the fish pond through a pipeline.

In the present disclosure, the recirculation aquaculture system includes a fiber turntable filtering system, where the fiber turntable filtering system includes a first fiber turntable filtering system and a second fiber turntable filtering system; the first fiber turntable filtering system is located in a first filter tank; the second fiber turntable filtering system is located in a second filter tank; the first fiber turntable filtering system includes a first fiber turntable filter; the second fiber turntable filtering system includes a second fiber turntable filter; a filter cloth in the first fiber turntable filter has a pore diameter of 15-30 μm; and a filter cloth in the second fiber turntable filter has a pore diameter of 1-5 μm; the first fiber turntable filtering system and the second fiber turntable filtering system each include a backwashing system and a supporting electrical control system; the water outlet of the fish pond communicates with the first filter tank and the second filter tank through a pipeline; and a filtered water outlet of the fiber turntable filtering system communicates with the water inlet of the fish pond through a pipeline.

In the present disclosure, water at the water outlet of the fish pond flows into the first filter tank or the second filter tank by means of gravity through the pipeline, and the pipeline is preferably provided with an electric valve.

In the present disclosure, the fiber turntable filter preferably includes a central rotary drum and a turntable, where the turntable is fixed around the central rotary drum, and communicates with the central rotary drum through a communication hole; filter cloths are installed on two sides of the turntable; a base cloth of each of the filter cloths is preferably made of a polyester fiber, and fluff on the base cloth is preferably made of a polyamide fiber.

In the present disclosure, the first fiber turntable filtering system and the second fiber turntable filtering system have a same filtration flux to same aquaculture sewage, to keep a constant liquid level of the fish pond; and a number of turntables of the first fiber turntable filter and the second fiber turntable filter depends on an amount of aquaculture sewage to be treated.

In the present disclosure, the filter cloth in the first fiber turntable filter has a pore diameter of 1-5 μm, preferably 1 μm; and the filter cloth in the second fiber turntable filter has a pore diameter of 15-30 μm, preferably 30 μm.

In the present disclosure, a tank wall of the first filter tank is preferably provided with a water inlet of the first filter tank, and a tank wall of the second filter tank is preferably provided with a water inlet of the second filter tank; a filtered water collecting tank is preferably arranged between the first filter tank and the second filter tank; a bottom of the filtered water collecting tank is provided with a filtered water outlet; bottoms of the first filter tank and the second filter tank are each provided with a sewage discharge outlet; and the first fiber turntable filtering system and the second fiber turntable filtering system share the filtered water collecting tank and the filtered water outlet.

In the present disclosure, the fiber turntable filtering system preferably further includes a sludge discharge system; the sludge discharge system preferably includes sludge discharge pipes respectively arranged at bottoms of the first filter tank and the second filter tank, and the sludge discharge pipes communicate with a reverse suction pump through a pipeline.

In the present disclosure, the sludge discharge pipes in the first filter tank and the second filter tank are preferably each provided with an electric valve; and the first fiber turntable filtering system and the second fiber turntable filtering system preferably share the reverse suction pump.

In the present disclosure, a filtered water outlet of the fiber turntable filtering system communicates with the water inlet of the fish pond through a pipeline, and the pipeline is preferably provided with a water pump.

In the present disclosure, the first fiber turntable filtering system and the second fiber turntable filtering system can operate independently but cannot be started synchronously; and water inflows of the first fiber turntable filtering system and the second fiber turntable filtering system are controlled by electric valves respectively. During microalgae culture, the first fiber turntable filtering system with a pore diameter of 15-30 μm is turned on, and microalgae can return to the fish pond through the first fiber turntable filter for continued cultivation; and large particles such as fish manure and residual bait either directly sink to the bottom, or are intercepted by the filter cloth of the first fiber turntable filter, and are discharged through the backwashing system and the sludge discharge system. When the microalgae in aquaculture water need to be removed, the second fiber turntable filtering system with a pore diameter of 1-5 μm is turned on for interception, and the microalgae are discharged by means of the backwashing system. After the microalgae in the water are removed, pre-cultured high-activity microalgae need to be added again.

In the present disclosure, during filtering by the fiber turntable filtering system, large particles in sewage are blocked by the filter cloth, and clear water passes through the filter cloth, flows into the central rotary drum by means of gravity, and then flows out of the fiber turntable filtering system through the filtered water outlet. Part of the large particles blocked by the filter cloth adhere to a surface of the filter cloth, and the other part of the large particles sink to the tank bottom. With the increase of attachments on the filter cloth, filtration resistance increases, and the water level of the filter tank gradually rises. When the liquid level reaches a set backwashing value, the supporting electrical control system starts the reverse suction pump and starts the backwashing process. During normal filtration, the turntable is in a static state, which is conducive to the direct sinking of aquaculture sewage particles to the bottom.

In the present disclosure, during backwashing by the fiber turntable filtering system, turntables rotate at a speed of about 1 r/min, and the supporting electrical control system sequentially cleans each group of turntables by controlling the electric valve connected to the pipeline of the reverse suction pump. The reverse suction pump sucks the surface of the filter cloth under a negative pressure. The clear water passing through the filter cloth cleans the filter cloth from inside to outside, and sludge gathered on the filter cloth is washed down and discharged sequentially through the reverse suction pump and the sewage discharge outlet. After all the turntables are cleaned, the liquid level in the filter tank returns to normal During backwashing, filtering is performed as usual, and the amount of backwashing water only accounts for about 1% that of the filtered water.

In the present disclosure, the sludge discharge system preferably includes sludge discharge pipes respectively arranged at bottoms of the first filter tank and the second filter tank, and the sludge discharge pipes communicate with a reverse suction pump through a pipeline; the sludge discharge pipes in the first filter tank and the second filter tank are preferably each provided with an electric valve: and the reverse suction pump is preferably provided with an electrical control system, to start the sludge discharge system based on working conditions.

In the present disclosure, a sewage discharging assembly is configured to discharge sludge.

In the present disclosure, the recirculation aquaculture system preferably further includes a system for removing soluble pollutants and a disinfection system. The system for removing soluble pollutants and the disinfection system are not specially limited in the present disclosure, and a conventional system for removing soluble pollutants- and disinfection system in the art may be adopted. During specific implementation of the present disclosure, the disinfection system performs ozone and ultraviolet disinfection.

In the present disclosure, the recirculation aquaculture system preferably further includes an automatic online monitoring system, which monitors swimming behavior and a feeding state, and can ensure safety of aquaculture water for fish. The automatic online monitoring system detects feeding behavior, dissolved oxygen, pH, water temperature and residual chlorine in the fish pond body online in real time.

The present disclosure further provides a recirculation aquaculture method based on the recirculation aquaculture system in the above solution, including the following steps.

1) Inject water and add pre-domesticated microalgae into a fish pond body, where an adding amount of the microalgae is 50-1000 mg/L of water;
2) Put fry, and put feed into the fish pond every 3-5 hours.
3) During culture, when the microalgae are in a final stage of stable growth and are about to enter a decline stage, turn off the first fiber turntable filter, and turn on the second fiber turntable filter, so that the microalgae no longer return to the fish pond; discharge the intercepted microalgae through the backwashing system, add a certain volume of pre-cultured high-activity microalgae to make an algae density in the aquaculture water be 50-1000 mg/L, and harvest fish after 150-200 days.

In the present disclosure, the water is injected and the pre-domesticated microalgae are added into the fish pond body until the algae density of aquaculture water is 50-1000 mg/L.

In the present disclosure, inlet water is preferably tap water, and a water inlet speed of the inlet water is preferably 60 m$^2$/h. In the present disclosure, when the water level in the fish pond is 15-25 cm away from the top of the fish pond, water inflow is completed. Taking a 100 m$^3$ fish pond body as an example, the time for completing the water inflow is preferably 1-2 hours, more preferably 1.5 hours. In the present disclosure, after the water inflow is completed, pre-cultured microalgae are added until the algae density in the aquaculture water is 50-1000 mg/L, preferably 100-500 mg/L, and more preferably 200 mg/L. After the microalgae are added, the first fiber turntable filtering system is started, and after running for 1-2 hours, fry are put into the fish pond. Species of the fry are not limited in the present disclosure, and conventional cultured fish in the art may be used. During specific implementation of the present disclosure, the species of the fry include *Oncorhynchus, Schizothorax, Oncorhynchus mykiss, Plectropomus leopardus, Lateolabrax japonicus* or *Siniperca chuatsi*. In the present disclosure, the feeding density of the fry is preferably 25-35 kg/m$^3$, more preferably 28-32 kg/m$^3$, and most preferably 30 kg/m$^3$.

In the present disclosure, the microalgae can pass through the filter cloth in the first fiber turntable filter, but cannot pass through the filter cloth in the second fiber turntable filter.

In the present disclosure, the microalgae are cultured by using the photofermentation system. Taking photofermentation culture of *Chlorella vulgaris* as an example, 10 L of *Chlorella vulgaris* is inoculated into a 100 L fermentor filled with a sterilized medium, and a light intensity continuously increases from 2.00 μmol/(n s) to 500 μmol/(m$^2$·s) according to a cell density. The medium has the pH of 6.0 and is at a temperature of 30° C., stirring is performed at a speed of 150 r/min, a ventilation rate is 200 L/min, and the culture is performed for 120 hours and then completed. A fed-batch feeding method during culture is as follows: According to growth of *Chlorella vulgaris*, several liters of 500 g/L glucose mother liquid is added once every 12 hours to ensure that a glucose concentration in the medium is 20-25 g/L; and 1 mol/L concentrated nitric acid is automatically added as a nitrogen source.

In the present disclosure, the microalgae preferably include one or more of *Chlorella vulgaris, Nannochloropsis Oceanica, Dunaliella salina*, and *Chlamydomonas reinhardtii*. Microalgae are a type of unicellular algae that has a small volume and a simple structure and grows and reproduces rapidly, and have the advantages such as high photosynthetic efficiency, strong environmental adaptability, and high biological yield.

After the pre-domesticated microalgae are added, in the present disclosure, fry are put, and feed is fed into the fish pond every 3.5-4.5 hours.

In the present disclosure, when the fry are *Oncorhynchus*, and when 80% or more of single fish weigh 20 g, an initial water inlet flow velocity is preferably 30-35 m$^3$/h, more preferably 35 m$^3$/h when 80% or more of single fish weigh 100 g, the initial water inlet flow velocity is preferably 35-40 m$^3$/h, more preferably 40 m$^3$/h; when 80% or more of single fish weigh 200-500 g, the initial water inlet flow velocity is preferably 45-50 m$^3$/h, more preferably 50 m$^3$/h; when 80% or more of single fish weigh 500-2,000 g, the initial water inlet flow velocity is preferably 50-60 m³/h, more preferably 60 m³/h; and when 80% or more of single fish weigh 2,000-3,500 g, the initial water inlet flow velocity is preferably 60-70 m³/h, more preferably 70 m³/h. When the fry are *Schizothorax*, an initial water inlet flow velocity is preferably 28-32 n/h, more preferably 30 m³/h, and an initial water outlet flow velocity is preferably 28-32 m³/h, more preferably 30 m³/h. In the present disclosure, as cultured fry grow, water inlet and outlet flow velocities of different water bodies are set different according to the density of cultured fish. When the aquaculture density in the water is greater than or equal to 30 kg/m³ and less than 60 kg/m³, a water inflow and a water outflow are each set to 35-45 m³/h, preferably 38-42 m³/h, and more preferably 40 m³/h; and when the aquaculture density in the water is greater than or equal to 60 kg/m³ and less than 100 kg/m³, the water inflow and the water outflow are each set to 55-65 m³/h, preferably 58-62 m³/h, and more preferably 60 m³/h; and when the aquaculture density in the water is greater than or equal to 100 kg/m³ and less than 200 kg/m³, the water inflow and the water outflow are each set to 70-90 m³/h, preferably 75-85 m³/h, and more preferably 80 m³/h.

In the present disclosure, when the aquaculture density in the water is greater than or equal to 30 kg/m³ and less than 60 kg/m³, a water inflow and a water outflow are each set to 35-45 m³/h; when the aquaculture density in the water is greater than or equal to 60 kg/m³ and less than 100 kg/m³, the water inflow and the water outflow are each set to 55-65 m³/h; and when the aquaculture density in the water is greater than or equal to 100 kg/m³ and less than 200 kg/m³, the water inflow and the water outflow are set to 70-90 m³/h.

In the present disclosure, during aquaculture, dissolved oxygen in the aquaculture water is 5-12 mg/L.

In the present disclosure, preferably, feed is fed into the fish pond every 4 hours. In the present disclosure, when single fish weigh 30-50 g, a feeding amount of feed is preferably 2.5%-3% of the total weight of the fish in the aquaculture water; an adding amount of the algae is preferably 800-1,200 L/100 m³ of water; and when single fish weigh 200-500 g, the feed amount of feed is preferably 2%-2.5% of the total weight of the fish in the aquaculture water.

During culture, when the microalgae are in a final stage of stable growth and are about to enter a decline stage, the first fiber turntable filter is turned off, and the second fiber turntable filter is turned on, so that the microalgae no longer return to the fish pond; the intercepted microalgae are discharged through the backwashing system, a certain volume of pre-cultured high-activity microalgae are added to make an algae density in the aquaculture water be 50-1000 mg/L, and fish are harvested after 150-200 days.

In the present disclosure, the addition of the microalgae has multiple effects. On the one hand, microalgae can effectively remove soluble pollutants such as nitrogen and phosphorus in water. After the microalgae are added, the microalgae can take the soluble pollutants such as nitrogen and phosphorus in the water as nutrients to implement growth and reproduction of the microalgae in the water. On the other hand, the growth and reproduction of the microalgae can release oxygen, and the released oxygen can be used by fish in the water, thereby reducing a demand for artificial aeration. Further, *Chlorella vulgaris* further has an inhibitory effect, and can inhibit the growth of harmful bacteria in water, maintain the water environment, and prevent fish in water from being infected with the harmful bacteria. In addition, the microalgae added into the water can be further used as feed for fish to eat. Moreover, polysaccharides produced on surfaces of microalgae can agglomerate and wrap nearby water-insoluble particles, increase the particle size and further improve the sedimentation of the particles, which is conducive to the rapid separation of the particles.

In the present disclosure, during aquaculture, aeration is performed for a fish and algae aquaculture system by using an aeration cone, and whether aeration is required is determined based on the concentration of dissolved oxygen. The dissolved oxygen of the fish and algae aquaculture system is kept at 7.0 mg/L or more. When the dissolved oxygen of the fish aquaculture system is less than 7.0 mg/L, aeration needs to be performed.

In the present disclosure, the fish are harvested after being cultured for 150-200 days. In the present disclosure, when the fish are *Oncorhynchus mykiss*, the put fry each weigh 4.5-5.5 g, the fish are preferably harvested after being cultured for 170-190 days, and the harvested *Oncorhynchus mykiss* each weigh 450-550 g. When the fish are *Oncorhynchus*, the put fry each weigh 4.5-5.5 g, and the harvested *Oncorhynchus* each weigh 2,000-3,600 g.

In the present disclosure, recirculation aquaculture and algae aquaculture are performed by using the aquaculture system. During the aquaculture, microalgae are regularly added into the fish and algae aquaculture system to convert $CO_2$ and nutrients such as nitrogen and phosphorus in water into substances of algae cells, thereby purifying water quality in the fish pond. The fiber turntable filtering system is used to fully remove particles, macromolecular proteins, algae, bacteria, viruses and the like in the aquaculture water, thereby implementing the recycling of aquaculture sewage and zero sewage discharge. Recirculating aquaculture at a high density high stability and low energy consumption can be truly implemented.

The technical solutions provided by the present disclosure will be described in detail below with reference to examples, but the examples should not be construed as limiting the claimed scope of the present disclosure.

Example 1

A recirculation aquaculture system is provided, and a structure of a fish pond is shown in FIG. 1, in which a fish pond body 1, a water inlet 2, a water outlet 3, a water outlet valve 4, a water pump 5, a water inlet 21 of a first filter tank, a water inlet 22 of a second filter tank, the first filter tank 23, the second filter tank 24, a first fiber turntable filtering system 25, a second fiber turntable filtering system 26, a filtered water collecting tank 27, a filtered water outlet 28 and a supporting electrical control system 29 are provided.

Figure 2:
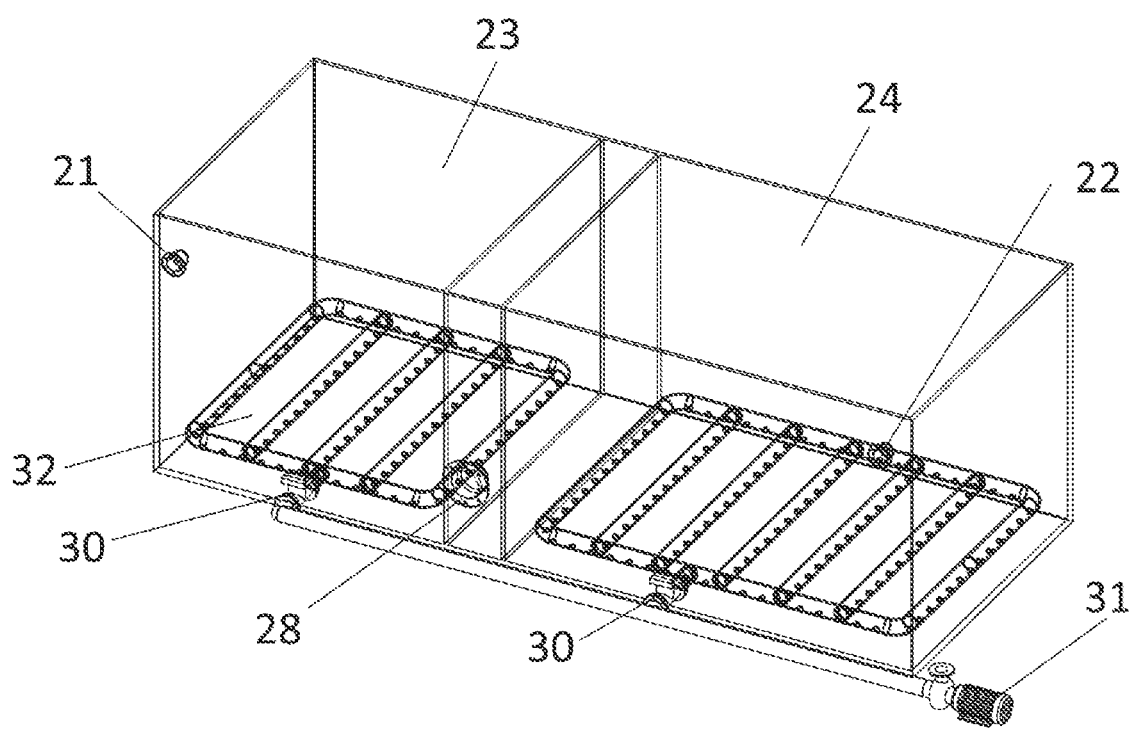
FIG. 2 is a schematic diagram of a sludge discharge system of a fiber turntable filtering system, in which a water inlet 21 of a first filter tank, a water inlet 22 of a second filter tank, the first filter tank 23, the second filter tank 24, a filtered water outlet 28, a sewage suction port 30, a reverse suction pump 31 and a sewage suction pipe 32 are provided.

A schematic diagram of a sludge discharge system of a fiber turntable filtering system is shown in FIG. 2, in which a water inlet 21 of a first filter tank, a water inlet 22 of a second filter tank, the first filter tank 23, the second filter tank 24, a filtered water outlet 28, a sewage suction port 30, a reverse suction pump 31 and a sewage suction pipe 32 are provided.

A method for fish aquaculture by using the recirculation aquaculture system of Example 1 was as follows.

Feeding was usually performed three times under normal conditions, at 8:00 a.m., 1:00 p.m., and 6:00 p.m. The feeding ability of *Oncorhynchus* is better when the water temperature is controlled at 14-18° C.

TABLE 1

Data of fish aquaculture by using the recirculation aquaculture system of this example

| Batch | Put time | Quantity of fish put (PCS) | Single weight (g) | Density (kg/m³) | Feeding amount (accounting for the total weight of fish) | Water inlet flow (m³/h) | Water quality | Aquaculture cycle (month) | Single weight (g) | Density (kg/m³) |
|---|---|---|---|---|---|---|---|---|---|---|
| *Oncorhynchus* 1 | 2019.9 | 5000 | 300 | 15 | 2.0% | 60 | Meet the aquaculture water standard | 10 | 2800 | 140 |
| *Oncorhynchus* 2 | 2020.9 | 30000 | 5 | 1.5 | 2.5% | 40 m³/h | Meet the aquaculture water standard | 6 | 260 | 78 |
| *Schizothorax* | 2020.9 | 50000 | 1.7 | 0.85 | 3.0% | 40 m³/h | Meet the aquaculture water standard | 6 | 24 | 12 |

Comparative Experiment:

Conventional fish ponds: aquaculture in a pond, aquaculture in a cement pond, and aquaculture in a net cage.

Aquaculture method: For conventional aquaculture, feeding is performed twice a day, and the water temperature is uncontrollable, and change according to a weather state.

TABLE 2

Data of fish aquaculture in conventional fish ponds

| Batch | Put time | Quantity of fish put (PCS) | Single weight (g) | Density (kg/m³) | Feeding amount (accounting for the total weight of fish) | Water inlet flow | Water quality | Aquaculture cycle (month) | Single weight (g) | Density (kg/m³) |
|---|---|---|---|---|---|---|---|---|---|---|
| *Oncorhynchus* 1 (Longyangxia) | 2019.9 | 25000 | 300 | 8 | 2.0% | — | Meet the aquaculture water standard | 10 | 2000 | 56 |
| *Oncorhynchus* 2 (Longyangxia) | 2020.9 | 30000 | 5 | 0.69 | 2.5% | — | Meet the aquaculture water standard | 6 | 150 | 20 |
| *Schizothorax* (Sichuan) | 2020.9 | 50000 | 1.7 | 0.85 | 3.0% | — | Meet the aquaculture water standard | 6 | 10 | 5 |

It can be seen that the single weight and density of fish in the recirculation aquaculture system provided in the present disclosure are remarkably greater than those of conventional aquaculture.

The above descriptions are merely preferred implementations of the present disclosure. It should be rioted that a person of ordinary skill in the art may further make several improvements and modifications without departing from the principle of the present disclosure but such improvements and modifications should be deemed as falling within the protection scope of the present disclosure.

What is claimed is:

1. A recirculation aquaculture system, comprising a fish pond and a fiber turntable filtering system, wherein
   the fish pond comprises a fish pond body, a water inlet, and a water outlet;
   the fiber turntable filtering system comprises a first fiber turntable filtering system and a second fiber turntable filtering system;
   the first fiber turntable filtering system is located in a first filter tank; the second fiber turntable filtering system is located in a second filter tank;
   the first fiber turntable filtering system comprises a first fiber turntable filter;
   the second fiber turntable filtering system comprises a second fiber turntable filter;
   a filter cloth in the first fiber turntable filter has a pore diameter of 15-30 μm;
   a filter cloth in the second fiber turntable filter has a pore diameter of 1-5 μm;
   the first fiber turntable filtering system and the second fiber turntable filtering system each comprise a backwashing system and a supporting electrical control system;
   the water outlet of the fish pond communicates with the first filter tank and the second filter tank through a pipeline; and
   a filtered water outlet of the fiber turntable filtering system communicates with the water inlet of the fish pond through a pipeline.

2. The recirculation aquaculture system according to claim 1, wherein the first fiber turntable filtering system and the second fiber turntable filtering system have a same filtration flux to same aquaculture sewage.

3. The recirculation aquaculture system according to claim 2, wherein a filtered water collecting tank is arranged between the first filter tank and the second filter tank; a bottom of the filtered water collecting tank is provided with a filtered water outlet; the first filter tank and the second filter tank are each provided with a sewage discharge outlet; and the first fiber turntable filtering system and the second fiber turntable filtering system share the filtered water collecting tank and the filtered water outlet.

4. The recirculation aquaculture system according to claim 1, wherein a filtered water collecting tank is arranged between the first filter tank and the second filter tank; a bottom of the filtered water collecting tank is provided with a filtered water outlet; the first filter tank and the second filter tank are each provided with a sewage discharge outlet; and the first fiber turntable filtering system and the second fiber turntable filtering system share the filtered water collecting tank and the filtered water outlet.

5. The recirculation aquaculture system according to claim 1, wherein the fiber turntable filtering system further comprises a sludge discharge system; the sludge discharge system comprises sludge discharge pipes respectively arranged at bottoms of the first filter tank and the second filter tank, and the sludge discharge pipes communicate with a reverse suction pump through a pipeline.

6. The recirculation aquaculture system according to claim 5, wherein the sludge discharge pipes in the first filter tank and the second filter tank are each provided with an electric valve; and the first fiber turntable filtering system and the second fiber turntable filtering system share the reverse suction pump.

7. A recirculation aquaculture method based on the recirculation aquaculture system according to claim 1, comprising the following steps:
  1) injecting water and adding pre-cultured high-activity microalgae into the fish pond body until an algae density of aquaculture water is 50-1000 mg/L;
  2) putting fry, and feeding feed into the fish pond every 3-5 hours; and
  3) during culture, when the microalgae are in a final stage of stable growth and are about to enter a decline stage, turning off the first fiber turntable filter, and turning on the second fiber turntable filter, so that the microalgae no longer return to the fish pond; discharging the intercepted microalgae through the backwashing system, replenishing a certain volume of pre-cultured high-activity microalgae to make an algae density in the aquaculture water be 50-1000 mg/L, and harvesting fish after 150-200 days.

8. The recirculation aquaculture method according to claim 7, wherein the first fiber turntable filtering system and the second fiber turntable filtering system have a same filtration flux to same aquaculture sewage.

9. The recirculation aquaculture method according to claim 8, wherein a filtered water collecting tank is arranged between the first filter tank and the second filter tank; a bottom of the filtered water collecting tank is provided with a filtered water outlet; the first filter tank and the second filter tank are each provided with a sewage discharge outlet; and the first fiber turntable filtering system and the second fiber turntable filtering system share the filtered water collecting tank and the filtered water outlet.

10. The recirculation aquaculture method according to claim 9, wherein an aquaculture density in step 1) is 25-35 kg/m$^3$.

11. The recirculation aquaculture method according to claim 8, wherein an aquaculture density in step 1) is 25-35 kg/m$^3$.

12. The recirculation aquaculture method according to claim 7, wherein a filtered water collecting tank is arranged between the first filter tank and the second filter tank: a bottom of the filtered water collecting tank is provided with a filtered water outlet; the first filter tank and the second filter tank are each provided with a sewage discharge outlet; and the first fiber turntable filtering system and the second fiber turntable filtering system share the filtered water collecting tank and the filtered water outlet.

13. The recirculation aquaculture method according to claim 12, wherein an aquaculture density in step 1) is 25-35 kg/m$^3$.

14. The recirculation aquaculture method according to claim 7, wherein the fiber turntable filtering system further comprises a sludge discharge system; the sludge discharge system comprises sludge discharge pipes respectively arranged at bottoms of the first filter tank and the second filter tank, and the sludge discharge pipes communicate with a reverse suction pump through a pipeline.

15. The recirculation aquaculture method according to claim 14, wherein the sludge discharge pipes in the first filter tank and the second filter tank are each provided with an electric valve; and the first fiber turntable filtering system and the second fiber turntable filtering system share the reverse suction pump.

16. The recirculation aquaculture method according to claim 14, wherein an aquaculture density in step 1) is 25-35 kg/m$^3$.

17. The recirculation aquaculture method according to claim 7, wherein an aquaculture density in step 1) is 25-35 kg/m$^3$.

18. The recirculation aquaculture method according to claim 7, wherein when the aquaculture density in the water is greater than or equal to 30 kg/m$^3$ and less than 60 kg/m$^3$, a water inflow and a water outflow are each set to 35-45 m$^3$/h; when the aquaculture density in the water is greater than or equal to 60 kg/m$^3$ and less than 100 kg/m$^3$, the water inflow and the water outflow are each set to 55-65 m$^3$/h; and when the aquaculture density in the water is greater than or equal to 100 kg/m$^3$ and less than 200 kg/m$^3$, the water inflow and the water outflow are each set to 70-90 m$^3$/h.

19. The recirculation aquaculture method according to claim 7, wherein during aquaculture, dissolved oxygen in the aquaculture water is 5-12 mg/L.

20. The recirculation aquaculture method according to claim 7, wherein the microalgae are capable of passing through the filter cloth in the first fiber turntable filter, but are not capable of passing through the filter cloth in the second fiber turntable filter; and the microalgae comprise one or more of *Chlorella vulgaris, Nannochloropsis Oceanica, Dunaliella salina,* and *Chlamydomonas reinhardtii*.

\* \* \* \* \*